(12) United States Patent
Bai et al.

(10) Patent No.: US 11,798,205 B2
(45) Date of Patent: Oct. 24, 2023

(54) IMAGE RECONSTRUCTION EMPLOYING TAILORED EDGE PRESERVING REGULARIZATION

(71) Applicant: KONINKLIJKE PHILIPS N.V., Eindhoven (NL)

(72) Inventors: Chuanyong Bai, Solon, OH (US); Andriy Andreyev, Willoughby Hills, OH (US); Bin Zhang, Cleveland, OH (US); James Gurian, Highland Heights, OH (US); Zhiqiang Hu, Twinsburg, OH (US); Yu-Lung Hsieh, Aurora, OH (US); Shekhar Dwivedi, Willoughby Hills, OH (US); Jinghan Ye, Livermore, CA (US); Xiyun Song, Cupertino, CA (US); Michael Allen Miller, Cleveland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 110 days.

(21) Appl. No.: 16/959,219

(22) PCT Filed: Jan. 2, 2019

(86) PCT No.: PCT/EP2019/050017
§ 371 (c)(1),
(2) Date: Jun. 30, 2020

(87) PCT Pub. No.: WO2019/134905
PCT Pub. Date: Jul. 11, 2019

(65) Prior Publication Data
US 2020/0334870 A1    Oct. 22, 2020

Related U.S. Application Data

(60) Provisional application No. 62/612,819, filed on Jan. 2, 2018.

(51) Int. Cl.
G06T 11/00 (2006.01)
G06T 5/00 (2006.01)
G06T 7/00 (2017.01)

(52) U.S. Cl.
CPC .......... G06T 11/006 (2013.01); G06T 5/002 (2013.01); G06T 7/0012 (2013.01);
(Continued)

(58) Field of Classification Search
CPC ..... G06T 2207/10081; G06T 2211/424; G06T 5/002; G06T 11/006
See application file for complete search history.

(56) References Cited

U.S. PATENT DOCUMENTS 9,478,049 B2 * 10/2016 Bippus ................. G06T 11/006
9,498,177 B2 * 11/2016 Bruder ................. A61B 6/4014
(Continued)

FOREIGN PATENT DOCUMENTS

WO    2017085587 A1    5/2017

OTHER PUBLICATIONS

International Search report and Written Opinion of PCT/EP2019/050017, dated May 27, 2019.
(Continued)

*Primary Examiner* — Gandhi Thirugnanam

(57) ABSTRACT

A non-transitory computer-readable medium stores instructions readable and executable by a workstation (18) including at least one electronic processor (20) to perform an image reconstruction method (100). The method includes: determining a weighting parameter (13) of an edge-preserving regularization or penalty of a regularized image reconstruction of an image acquisition device (12) for an imaging data set obtained by the image acquisition device; determining an edge sensitivity parameter ($\gamma$) of the edge-preserving algorithm for the imaging data set obtained by the image
(Continued)

acquisition device; and reconstructing the imaging data set obtained by the image acquisition device to generate a reconstructed image by applying the regularized image reconstruction including the edge-preserving regularization or penalty with the determined weighting and edge sensitivity parameters to the imaging data set obtained by the image acquisition device.

17 Claims, 4 Drawing Sheets

(52) U.S. Cl.
CPC ............... *G06T 2200/24* (2013.01); *G06T 2207/10081* (2013.01); *G06T 2207/30004* (2013.01)

(56) References Cited

U.S. PATENT DOCUMENTS

| | | | | |
|---|---|---|---|---|
| 9,542,763 | B2* | 1/2017 | Bilgic | A61B 5/4848 |
| 9,734,601 | B2* | 8/2017 | Bresler | G06T 11/006 |
| 10,403,006 | B2* | 9/2019 | Bhagalia | A61B 6/482 |
| 10,551,461 | B2* | 2/2020 | Chaari | G01R 33/5611 |
| 2006/0215891 | A1* | 9/2006 | Fessler | G06T 11/005 |
| | | | | 382/128 |
| 2011/0293158 | A1* | 12/2011 | Popescu | G06T 11/006 |
| | | | | 382/266 |
| 2014/0364736 | A1* | 12/2014 | Huang | A61B 8/0825 |
| | | | | 600/447 |
| 2016/0055658 | A1* | 2/2016 | Liang | G06T 11/006 |
| | | | | 382/131 |
| 2017/0053423 | A1* | 2/2017 | Ahn | A61B 6/037 |
| 2017/0294034 | A1* | 10/2017 | Zhou | G06T 7/0012 |
| 2018/0033165 | A1* | 2/2018 | Zeng | G06T 11/003 |
| 2018/0101948 | A1* | 4/2018 | Yu | G06T 5/002 |
| 2019/0228546 | A1* | 7/2019 | Andreyev | G06T 7/136 |
| 2019/0325619 | A1* | 10/2019 | Zhang | G06T 5/20 |
| 2020/0105032 | A1* | 4/2020 | Yang | G06T 5/002 |
| 2020/0196972 | A1* | 6/2020 | Zhou | A61B 6/5205 |
| 2020/0334870 | A1* | 10/2020 | Bai | G06T 7/0012 |

OTHER PUBLICATIONS

Asma, Evren et al "Quantitatively Accurate Image reconstruction for Clinical Whole-Body PET Imaging", 2012 IEEE Nuclear Science Symposium and Medical Imaging Conference Record, pp. 4062,4066.

De Bernardi, Elisabetta et al "Reconstruction of uptake patterns in PET: The Influence of regularizing Prior", Medical Physics, vol. 44, No. 5, May 2017, pp. 1823-1836.

Asma, Evren et al "Accurate and Consistent Lesion Quantitation with Clinically Acceptable Penalized Likelihood Images", 2012 IEEE Nuclear Science Symposium and Medical Imaging Conference Record, pp. 4062-4066.

Nuyts et al "A Concave prior Penalizing relative Differences for Maximum-a-posteriori reconstruction in Emission tomography", IEEE Transactions on Nuclear Science, vol. 49, No. 1, pp. 56-60, 2002.

Ahn, S. et al "Quantitiative Comparison of OSEM and Penalized Likelihood Image Reconstruction using Relative Difference penalties for Clinical PET", Physics in Meidcal Biology, vol. 60, pp. 5733-5751, 2015.

* cited by examiner

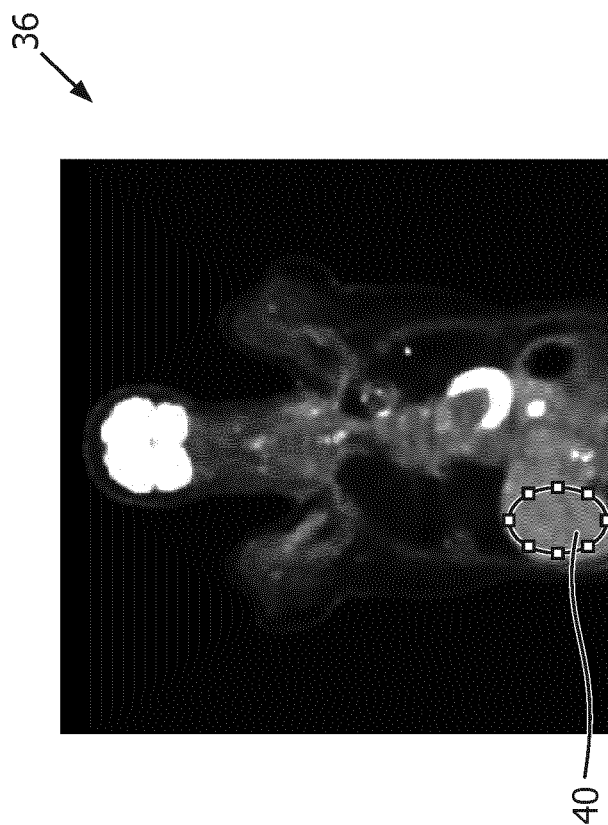
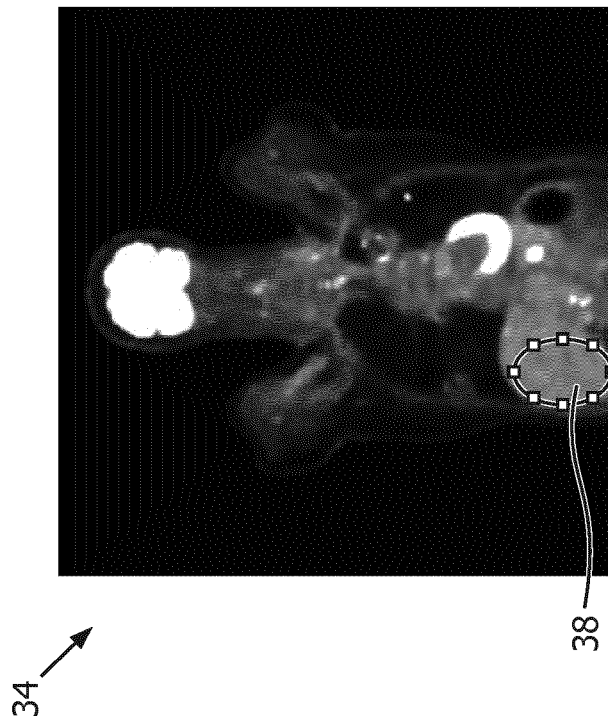
FIG. 4

IMAGE RECONSTRUCTION EMPLOYING TAILORED EDGE PRESERVING REGULARIZATION

CROSS-REFERENCE TO PRIOR APPLICATIONS

This application is the U.S. National Phase application under 35 U.S.C. § 371 of International Application No. PCT/EP2019/050017, filed on Jan. 2, 2019, which claims the benefit of U.S. Provisional Patent Application No. 62/612,819, filed on Jan. 2, 2018. These applications are hereby incorporated by reference herein.

FIELD

The following relates generally to the medical imaging arts, medical image interpretation arts, image reconstruction arts, and related arts.

BACKGROUND

Iterative image reconstruction is commonly used in reconstructing emission imaging data such as positron emission tomography (PET) or single photon emission computed tomography (SPECT) imaging data. Iterative reconstruction has known advantages over other techniques such as filtered back projection. However, iterative reconstruction is also known to have a disadvantage in that it is susceptible to introducing spurious higher intensity features that can be misinterpreted in a clinical setting, e.g. misinterpreted as malignant tumors. Regularization introduces prior knowledge for reducing such artifacts. In edge preserving regularization techniques, a regularization or penalty is applied which suppresses small-volume high intensity features, based on the prior knowledge that small-volume high intensity features are likely to be artifacts of the iterative reconstruction rather than representing physical features of the imaging subject. An illustrative example of an edge preserving regularization is a relative differences prior (RDP), the logarithm of which is given by $\Sigma_{k \in N_j} M_{jk}$ where $N_j$ is a set of neighboring pixels which neighbor the pixel indexed by j, and:

$$M_{jk} = -\beta \frac{(\lambda_j - \lambda_k)^2}{\lambda_j + \lambda_k + \gamma|\lambda_j - \lambda_k|} \quad (1)$$

where $\lambda_j$ and $\lambda_k$ are the activities of the pixels indexed by j and k respectively. See Nuyts et al., "A concave prior penalizing relative differences for maximum-a-posteriori reconstruction in emission tomography", IEEE Trans. on Nuclear Science vo. 49 no. 1 pp. 56-60 (2002). In the RDP, $\beta$ is an overall weight of the edge-preserving regularization prior, and $\gamma$ controls the shape sensitivity, i.e. serves as an edge detection metric parameter. More generally, edge preserving priors include an overall weighting parameter ($\beta$ in the RDP) and an edge sensitivity parameter ($\gamma$ in the RDP); other examples of edge preserving priors include the Anisotropic Diffusion Prior (ADP), the Lange prior, or so forth. Regularized reconstruction usually is controlled by two parameters: an overall weighting factor that controls the overall "strength" of the regularization; and an edge sensitivity parameter that controls how "small" the feature must be (for a certain intensity; i.e. how steep the intensity drop-off) before the penalty comes into action.

The following discloses new and improved systems and methods to overcome these problems.

SUMMARY

In one disclosed aspect, a non-transitory computer-readable medium stores instructions readable and executable by a workstation including at least one electronic processor to perform an image reconstruction method. The method includes: determining a weighting parameter ($\beta$) of an edge-preserving regularization or penalty of a regularized image reconstruction of an image acquisition device for an imaging data set obtained by the image acquisition device; determining an edge sensitivity parameter ($\gamma$) of the edge-preserving algorithm for the imaging data set obtained by the image acquisition device; and reconstructing the imaging data set obtained by the image acquisition device to generate a reconstructed image by applying the regularized image reconstruction including the edge-preserving regularization or penalty with the determined weighting and edge sensitivity parameters to the imaging data set obtained by the image acquisition device.

In another disclosed aspect, an imaging system includes an image acquisition device configured to acquire imaging data. At least one electronic processor is programmed to: determine a weighting parameter of an edge-preserving regularization or penalty of a regularized image reconstruction of the image acquisition device for an imaging data set obtained by the image acquisition device; determine a edge sensitivity parameter of the edge-preserving algorithm for the imaging data set obtained by the image acquisition device; and reconstruct the imaging data set obtained by the image acquisition device to generate a reconstructed image by applying the regularized image reconstruction including the edge-preserving regularization or penalty with the determined weighting and edge sensitivity parameters to the imaging data set obtained by the image acquisition device.

In another disclosed aspect, an imaging system includes an image acquisition device configured to acquire imaging data. At least one electronic processor is programmed to: determine a weighting parameter of an edge-preserving regularization or penalty of a regularized image reconstruction of the image acquisition device for an imaging data set obtained by the image acquisition device by selecting the weighting parameter based on a received user input indicative of the noise reduction goal for the reconstructed image; determine an edge sensitivity parameter of the edge-preserving algorithm for the imaging data set obtained by the image acquisition device by selecting the edge sensitivity parameter based on a received user input indicative of the desired quantitation goal for the reconstructed image; and reconstruct the imaging data set obtained by the image acquisition device to generate a reconstructed image by applying the regularized image reconstruction including the edge-preserving regularization or penalty with the determined weighting and edge sensitivity parameters to the imaging data set obtained by the image acquisition device.

One advantage resides in optimizing an image acquisition device based on a physician's preferences.

Another advantage resides in providing an image acquisition device which limits the maximum noise in a region of interest in acquired imaging data.

Another advantage resides in providing an image acquisition device with a specified percentage error in maximum standard uptake values (SUV) in acquired imaging data.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

FIG. 4 illustratively shows reconstructed images generated form imaging data acquired by the image reconstruction system of FIG. 1.

DETAILED DESCRIPTION

Figure 1:
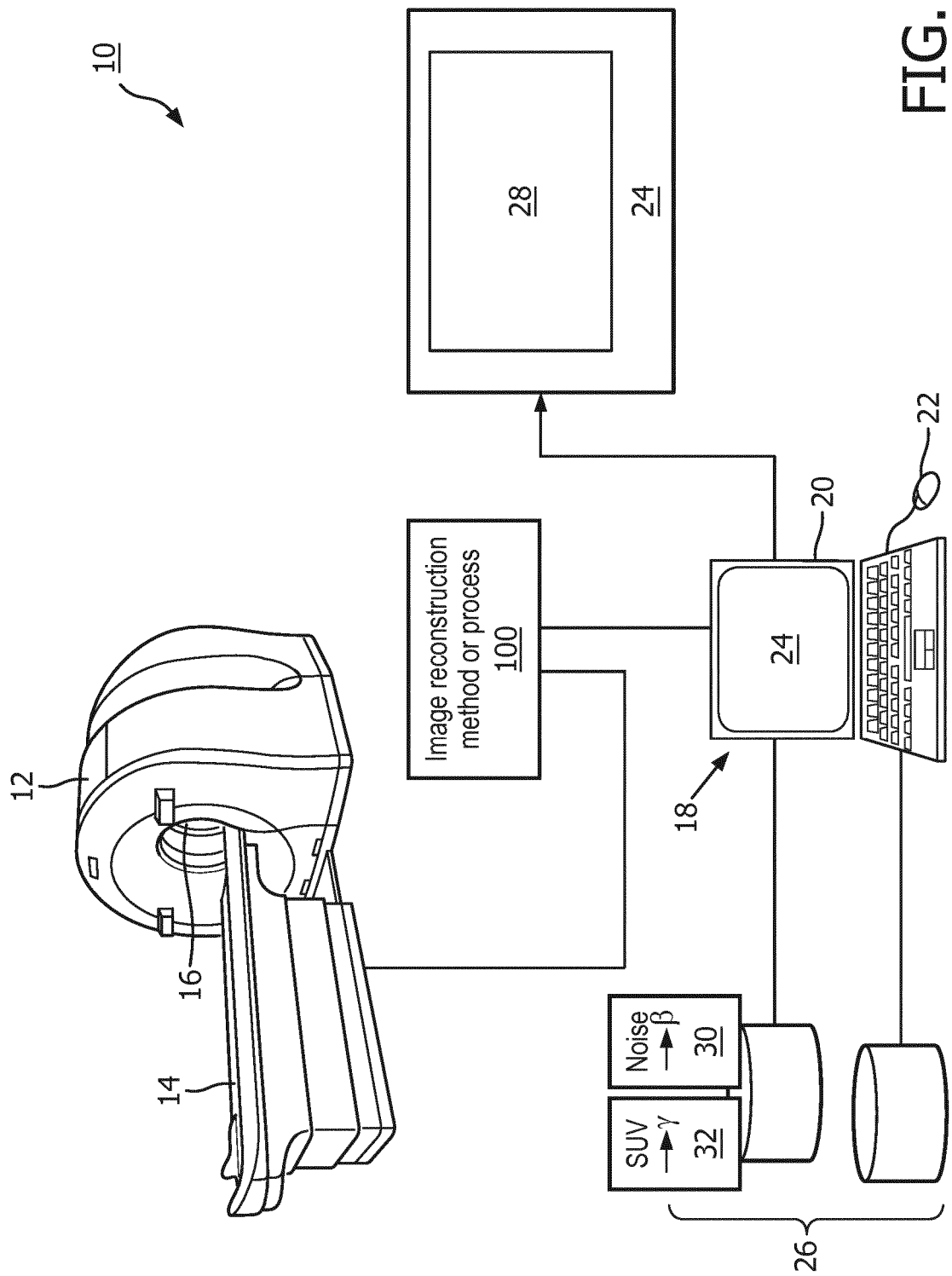
FIG. 1 diagrammatically shows image reconstruction system according to one aspect.

Regularized reconstruction employs an edge preserving prior (or penalty) to provide edge-preserving smoothing by penalizing (i.e., suppressing) small hot spots that are likely due to noise while preserving (i.e. not suppressing) larger high intensity areas likely to be true image features. For example, a relative difference prior (RDP) is one such prior, which is parameterized by two parameters: $\beta$ and $\gamma$. The parameter $\beta$ is an overall weighting factor for the penalty that controls how much penalty is applied; while, the parameter $\gamma$ is an edge sensitivity parameter that controls the transition between what is considered a small hot spot to be suppressed versus a larger feature to be preserved. Other types of edge preserving priors, e.g. anisotropic diffusion penalty (ADP), Lange function-based edge preserving priors, or so forth also generally have a weighting parameter analogous to $\beta$ and an edge sensitivity parameter analogous to $\gamma$.

Using regularized reconstruction with two parameters, conventional parameter tuning would be based on two-dimensional (2D) mapping of the parameters with the image quality and quantitation, and then empirically choosing a parameter setting based on physician's preference of image quality and quantitation. However, two-dimensional parameter mapping is time consuming and does not have a guidance of how the mapping can be practically simplified. An empirical approach is to fix one parameter to a default value, then only tune the other parameter, effectively reducing the 2D parameter tuning into a one-dimensional (1D) tuning.

As disclosed in S. Ahn et al., "Quantitative comparison of OSEM and penalized likelihood image reconstruction using relative difference penalties for clinical PET", Phys. Med. Biol., 60, pp. 5733-5751, 2015, a $\gamma$ value of 2.0 is chosen empirically. Then only the parameter $\beta$ is tuned for the regularization reconstruction.

When evaluating the application of regularized reconstruction to positron emission tomography (PET) imaging, this parameter tuning approach has several drawbacks. For example, it is not transparent or straightforward to users of how and why the parameters are chosen and the parameters do not convey specific physical meaning to the users. For example, increasing $\beta$ leads to more noise reduction, but results in more image blurring, lower contrast, reduced quantitation, e.g., tumor SUV. Increasing $\gamma$ leads to sharper image, higher contrast and smaller impact on quantitation, but less regularization. To achieve the best image quality and quantitation combination, $\gamma$ cannot be too large, otherwise the image would be too noisy; but it cannot be too small, otherwise, the edge-preservation would be compromised. On the other hand, $\beta$ cannot be too large, otherwise, the whole image would be penalized and become too blurred and lose the quantitative accuracy. But if $\beta$ is too small, then there is not enough regularization (penalty) to achieve sufficient noise control. Obtaining the optimal setting of the $\beta$ and $\gamma$ values is a 2D mapping effort with the resultant image quality and quantitation.

Moreover, the "hard coded" $\gamma$ value of 2.0 may be able to achieve the best performance for certain structures when $\beta$ is adjusted, but such $\beta$ may lead to over regularization on some other structures in the one hand yet under regularization for still some other structures on the other hand.

The following discloses an improvement to optimize both the weighting parameter $\beta$ and the edge preservation parameter $\gamma$ for a particular doctor's preferences, and for a particular patient. In an illustrative example, the weighting parameter $\beta$ is optimized to limit the maximum noise in the liver (which is a large relatively uniform region in many PET imaging tasks) to a design-basis value which may be chosen on the basis of the physician's preferences. As this noise may depend on the patient's girth or other imaging dataset-specific considerations, it is contemplated for this optimization to involve a single reconstruction using some default value (e.g. without any regularization, or using the edge-preserving regularization with fixed default $\beta$ and $\gamma$ values). These inputs (physician-desired maximum noise value, and optional "baseline" liver noise information from the single reconstruction) is input to a lookup table or an empirical calibration curve to select $\beta$ generated from phantom data or the like.

Next, the edge preservation parameter $\gamma$ is optimized. This may be chosen to be as aggressive as possible (that is to maximally smooth features, or in other words, to smooth as large a feature as possible) while ensuring that quantitative information for true features is not degraded below some threshold value. For example, this may be to make $\gamma$ as aggressive as possible without producing more than a specified percentage error in (maximum) standard uptake values (SUV) or SUV normalized by lean body mass (SUL) preservation. Again, a formula or lookup table generated from phantom data may be used, with inputs including the doctor's preference on largest acceptable impact on quantitation (e.g. SUV).

Since the impact of the edge preserving regularization on SUV may be impacted by $\beta$ as well, another disclosed approach is to first determine $\beta$ which then serves as an input to the lookup table or formula for computing $\gamma$.

The disclosed approach may be combined with CT-guidance of the edge-preserving prior.

The following discloses a frame work of how to simplify and optimize the parameter tuning process for regularized reconstruction when applied to clinical imaging. The frame work is focused on using clinical requirement on image quality and quantitation as the guidance for the tuning optimization. The following uses PET reconstruction as an example to describe the frame work, i.e., starting from the translation of clinical requirements into parameter tuning guidance, and then proceeding with the tuning optimization using the guidance.

Clinical sites usually have standard clinical protocols for patient scans, leading to similar count density in different patient studies. Physicians also have a preference of the image noise level they feel comfortable to make reliable diagnosis.

Disclosed embodiments may employ the following two steps that are guided by clinical requirement on image quality and quantitation. In a first step, a physician's preferred image noise level is used to tune parameter β, while keeping parameter γ at roughly optimized value from the mathematically point of view, such as γ=2. The tuning can be based on what noise reduction the physician wants to see. For example, if the physician wants to have the noise level in liver (a general reference physicians use as a baseline assessment of overall image quality) reduced by a factor of two, the tuning of β can be manual or automatic until the goal is met. In a second step, the physician's preference of quantitative performance, such as tumor SUV preservation, is used to fine turn γ and/or β.

The parameter tuning described above is transparent to the user and easy to understand. The obtained parameter set from the above steps is directly associated with the physician preferred/desired image quality and quantitation, and can be applied to the regularized reconstruction for all the patients scans following the same clinical protocols.

In some embodiments, physicians can perform their own parameter tuning based on the image quality and quantitation they desire, making the tuning meaningful, understandable, and flexible.

When whole body scans are performed, the disclosed tuning approach can be fully automatic while still following the image quality and quantitation guidance. One automatic embodiment automatically segments the patient liver, reconstructs the image using the non-regularized reconstruction protocol that generates the images physicians prefer, then reconstructs using regularized reconstruction as is done in the first step. The automatically segmented liver is later used as the region of interest (ROI) to compute noise levels in the two images. If the noise in the regularized reconstruction is not suppressed as much as the physician wants, then the process repeats with increased regularization (by increasing β slightly), until the noise level is met, allowing automatic parameter tuning to obtain the baseline β parameter for each patient.

The quantitative guidance to fine tune γ and/or β can be implemented in a variety of ways. In one example, if physicians want to protect lesions with an SUV value 2 units higher than its background, one can tune the penalty lower when a voxel is detected to have an SUV value 2 units or more higher than its background, such as reducing β. In another example, if physicians want to protect lesions with an SUV value 5 or above, then one can tune the penalty lower when a voxel has an SUV value 5 or above. In a further example, one can also do more sophisticated parameter tuning using information such as the local SUV variation as an input.

Although described herein for PET imaging systems, the disclosed approaches can be disclosed in computed tomography (CT) imaging systems, hybrid PET/CT imaging systems; single photon emission computed tomography (SPECT) imaging systems, hybrid SPECT/CT imaging systems, magnetic resonance (MR) imaging systems; hybrid PET/MR, functional CT imaging systems, functional MR imaging systems, and the like.

With reference to FIG. 1, an illustrative medical imaging system 10 is shown. As shown in FIG. 1, the system 10 includes an image acquisition device 12. In one example, the image acquisition device 12 can comprise a PET imaging device. In other examples, the image acquisition device 12 can be any other suitable image acquisition device (e.g., MR, CT, SPECT, hybrid devices, and the like). A patient table 14 is arranged to load a patient into an examination region 16, and more particularly can move a prone or supine patient axially either into the examination region of the PET scanner 12 for PET imaging.

The system 10 also includes a computer or workstation or other electronic data processing device 18 with typical components, such as at least one electronic processor 20, at least one user input device (e.g., a mouse, a keyboard, a trackball, and/or the like) 22, and a display device 24. In some embodiments, the display device 24 can be a separate component from the computer 18. The workstation 18 can also include one or more non-transitory storage media 26 (such as a magnetic disk, RAID, or other magnetic storage medium; a solid state drive, flash drive, electronically erasable read-only memory (EEROM) or other electronic memory; an optical disk or other optical storage; various combinations thereof; or so forth). The display device 24 is configured to display a graphical user interface (GUI) 28 including one or more fields to receive a user input from the user input device 22.

The at least one electronic processor 20 is operatively connected with the one or more non-transitory storage media 26 which stores instructions which are readable and executable by the at least one electronic processor 20 to perform disclosed operations including performing an image reconstruction method or process 100. In some examples, the image reconstruction method or process 100 may be performed at least in part by cloud processing. The non-transitory storage media 26 further store information for determining the weighting and edge sensitivity parameters for a given image reconstruction. For example, the weighting parameter may be selected using calibration data or a data structure 30, such as a lookup table 30 associating values of the weighting parameter with values of the noise reduction goal (e.g. a desired maximum noise level in the liver or some other ROI), or the weighting parameter may be selected as a value of a calibration curve 30 relating the weighting parameter to the noise reduction goal. Likewise, the edge sensitivity parameter may be selected using calibration data or a data structure 32, such as a lookup table 32 associating values of the edge sensitivity parameter with values of a quantitation goal (e.g. indicative of a desired standardized uptake value, SUV, preservation), or the edge sensitivity parameter may be selected as a value of a calibration curve 32 relating the edge sensitivity parameter to the quantitation goal.

Figure 2:
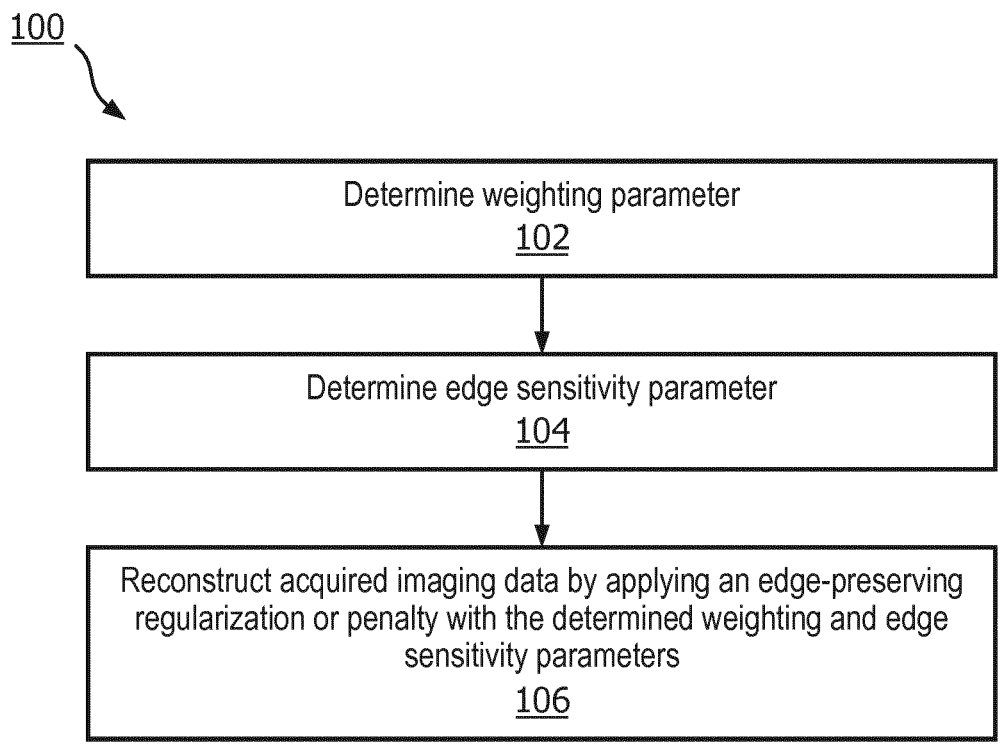
FIG. 2 shows an exemplary flow chart operation of the system of FIG. 1.

With reference to FIG. 2, an illustrative embodiment of the image reconstruction method 100 is diagrammatically shown as a flowchart. To begin the process, the image acquisition device 12 (e.g., the CT imaging device) is configured, or controlled by the at least one electronic processor 20, to obtain a surview image of a target anatomy (e.g., the heart). At 102, the at least one electronic processor 20 is programmed to determine a weighting parameter (β) of an edge-preserving regularization or penalty of a regularized image reconstruction of the image acquisition device 12 for an imaging data set obtained by the image acquisition device, e.g. using the data structure 30. To do so, the at least one electronic processor 20 is programmed to determine the weighting parameter by receiving, by a medical professional (e.g., a doctor, a technologist, and the like), a user input indicative of a noise reduction goal for the reconstructed image via inputs from the user input device 22 (e.g., a mouse click, a keyboard key stroke, and the like) on the GUI 28.

The weighting parameter is selected based on the received user input indicative of the noise reduction goal for the reconstructed image. In one example, the at least one electronic processor 20 is programmed to select the weighting parameter using a lookup table 30 associating values of the weighting parameter with values of the noise reduction goal. In another example, the at least one electronic processor 20 is programmed to select the weighting parameter as a value of a calibration curve 30 relating the weighting parameter to the noise reduction goal. The look up table or calibration curve 30 are suitably stored in the non-transitory storage medium 26. In some embodiments, the received user input indicative of the noise reduction goal for the reconstructed image is indicative of a desired maximum noise level, in particular the desired maximum noise level in the liver.

In some embodiments, the noise reduction goal can be determined by analyzing a group of patient studies. For example, a medical professional (e.g., a doctor, a nurse, a radiologist, and the like) can be obtained from a database (e.g., the non-transitory storage media 26; a Radiology Information System (RIS) database (not shown); a Picture Archiving and Communication System (PACS) database (not shown), and so forth). The medical professional can identify a predetermined number of images based on the medical professional's preferences (e.g., 1,000 images) that have a preferred noise level consistent with the noise reduction goal (e.g., a noise level in the liver). An overall noise level of the retrieved images determined from the analyzed images can be input to the at least one electronic processor 20 to determine or select the weighting parameter.

At 104, the at least one electronic processor 20 is programmed to determine an edge sensitivity parameter ($\gamma$) of the edge-preserving algorithm for the imaging data set obtained by the image acquisition device 12, e.g. using the data structure 32. To do so, the at least one electronic processor 20 is programmed to receive a user input from the user input device 22 of a desired quantitation goal for the reconstructed image.

The edge sensitivity parameter is selected based on the received user input indicative of the desired quantitation goal for the reconstructed image. In one example, the at least one electronic processor 20 is programmed to select the edge sensitivity parameter using the lookup table 32 associating values of the edge sensitivity parameter with values of the quantitation goal. In another example, the at least one electronic processor 20 is programmed to select the edge sensitivity parameter as a value of the calibration curve 32 relating the edge sensitivity parameter to the quantitation goal. In some embodiments, the received user input indicative of the quantitation goal for the reconstructed image is indicative of a desired standardized uptake value (SUV) preservation.

It is contemplated for the data structures 30, 32 to take into account other information besides the respective noise and quantitation goals. For example, the noise may depend on the patient's girth or other imaging dataset-specific considerations. Accordingly, the data structure 30 may include values for $\beta$ depending on both the noise goal and patient girth. In another approach, it is contemplated for the optimization of the weighting parameter to involve a single reconstruction using some default value (e.g. without any regularization, or using the edge-preserving regularization with fixed default $\beta$ and $\gamma$ values). These inputs (physician-desired maximum noise value, and optional "baseline" liver noise information from the single reconstruction) is then input to a lookup table or empirical calibration curve 30 to select $\beta$. In these examples, the calibration data 30 may be generated empirically by measurements of phantoms representing patients of different girths or so forth, or from actual historical patient data if available and permissibly used for developing the data structure 30.

In some embodiments, the determination of the weighting parameter and the edge sensitivity parameter can be performed in conjunction with one another. In one example embodiment, the at least one electronic processor 20 is programmed to control the display device 24 to display a plurality of sample reconstructed images generated by reconstructing a sample imaging data set by applying the regularized image reconstruction including the edge-preserving regularization or penalty with different weighting and edge sensitivity parameters to the sample imaging data set. The at least one electronic processor 20 is programmed to receive a user selection via the user input device 22 of one of the displayed plurality of sample reconstructed images. The at least one electronic processor 20 is then programmed to determine the weighting parameter based on the weighting parameter used in generating the selected sample reconstructed image; and/or determine the edge sensitivity parameter based on the edge sensitivity parameter used in generating the selected sample reconstructed image.

In another example embodiment, the weighting parameter is determined prior to determining the edge sensitivity parameter; and the determining of the edge sensitivity parameter includes determining the edge sensitivity parameter based at least in part on the determined weighting parameter. In one example, the at least one electronic processor 20 is programmed to set a default value of one of the weighting parameter and the edge sensitivity parameter (e.g., automatically, via a user input from the user input device 22, and so forth). The at least one electronic processor 20 is then programmed to input the set default value into the lookup table 30, 32, and determine the other of the weighting parameter and the edge sensitivity parameter from a corresponding value in the lookup table.

At 106, the at least one electronic processor 20 is programmed to reconstruct the imaging data set obtained by the image acquisition device 12 to generate a reconstructed image by applying the regularized image reconstruction including the edge-preserving regularization or penalty with the determined weighting and edge sensitivity parameters to the imaging data set obtained by the image acquisition device. In one example, the reconstruction is performed by applying the regularized image reconstruction including the edge-preserving regularization or penalty with the determined weighting and edge sensitivity parameters and guided by an image or attenuation map generated by computed tomography (CT).

Figure 3:
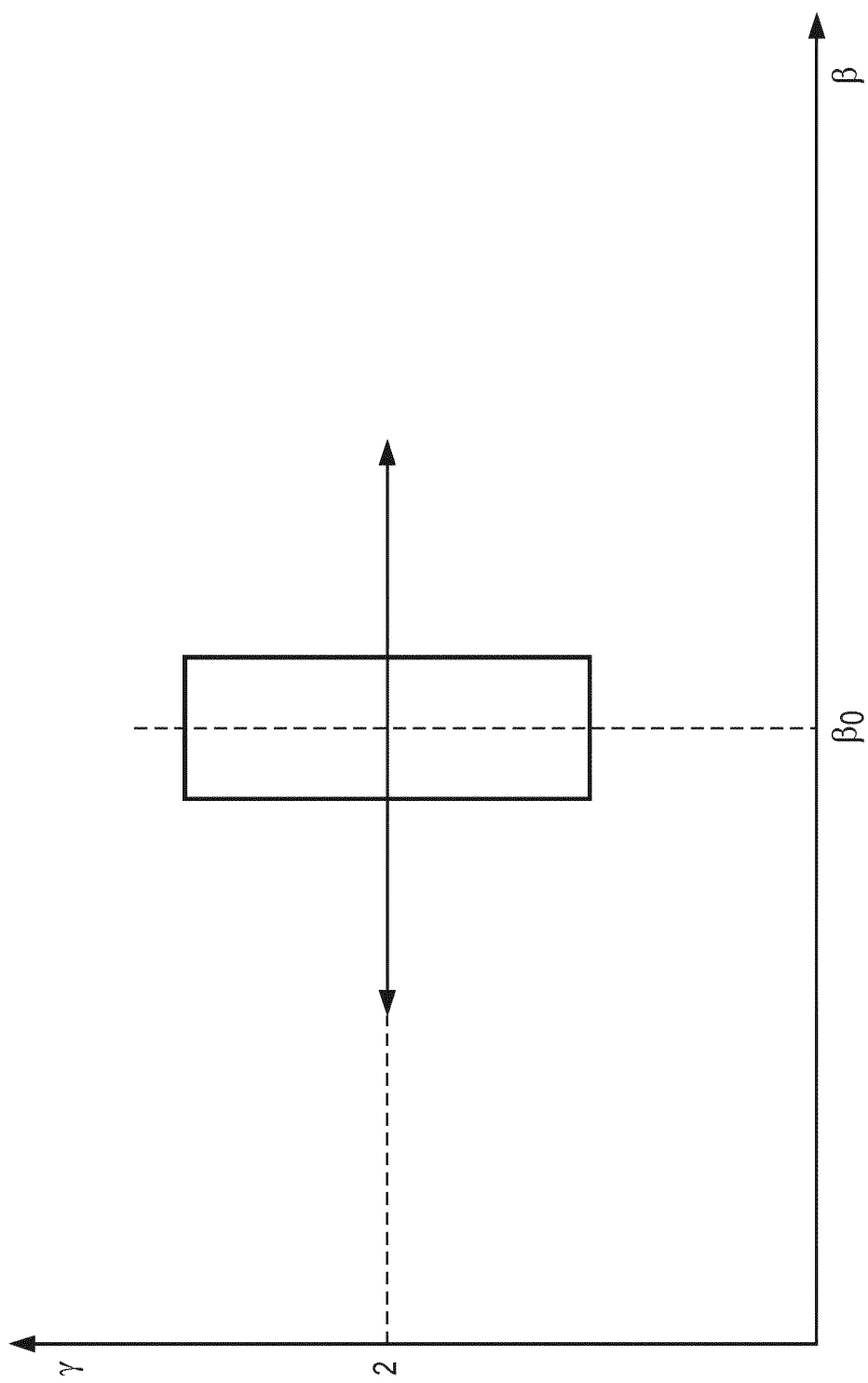
FIG. 3 illustratively shows an example operation of the system of FIG. 1.

FIG. 3 illustratively shows an example implementation of the image reconstruction method 100. As shown in FIG. 3, a baseline weighting parameter $\beta_o$ is determined when the edge sensitivity parameter $\gamma$ is set to a default value (e.g., $\gamma=2$). The baseline weighting parameter $\beta_0$ is determined using local imaging data information. Once the baseline weighting parameter $\beta_0$ is determined, it is used to fine tune both the weighting parameter $\beta$ and the edge sensitivity parameter $\gamma$, as illustrated by the box in FIG. 3.

FIG. 4 illustratively shows an example implementation of a display of a display (e.g., on the display device 24 of FIG. 1) of reconstructed images 34 and 36. The image 36, using the determined parameters $\beta$ and $\gamma$, achieve a doubled signal to noise ratio in liver in regularized image reconstruction as compared to the conventional list-mode ordered subset expectation maximization (OSEM) reconstruction of the image 34. The liver 38 and 40 in the conventionally reconstructed image 34 and the regularized reconstruction image 36, respectively (denoted by dashed ellipses) have a standard deviation were 250.15 and 31.92 in the conventionally reconstructed image 34, and 263.28 and 15.60 in the regularized reconstruction image 36, respectively. The signal to noise ratio was improved from 7.84 in the conventionally reconstructed image 34 to 16.88 in the regularized reconstruction image 36.

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer-readable medium storing instructions readable and executable by a workstation including at least one electronic processor to perform an image reconstruction method, the method comprising:
   determining an overall noise level in a plurality of images, the plurality of images having a preferred noise level consistent with a noise reduction goal;
   determining a weighting parameter ($\beta$) of an edge-preserving regularization of a regularized image reconstruction for an imaging data set obtained by the image acquisition device based on the determined overall noise level;
   after determining the weighting parameter ($\beta$), determining an edge sensitivity parameter ($\gamma$) of the edge-preserving regularization for the imaging data set obtained by the image acquisition device, wherein the edge sensitivity parameter ($\gamma$) is determined based on the determined weighting parameter ($\beta$); and
   reconstructing the imaging data set obtained by the image acquisition device to generate a reconstructed image by applying the regularized image reconstruction including the edge-preserving regularization with the determined weighting parameter ($\beta$) and the determined edge sensitivity parameter ($\gamma$) to the imaging data set obtained by the image acquisition device.

2. The non-transitory computer-readable medium of claim 1, wherein the determining of the weighting parameter includes:
   receiving a user input indicative of the noise reduction goal for the reconstructed image; and
   selecting the weighting parameter based on the received user input indicative of the noise reduction goal for the reconstructed image.

3. The non-transitory computer-readable medium of claim 2, wherein the selecting includes one of:
   selecting the weighting parameter using a lookup table associating values of the weighting parameter with values of the noise reduction goal, and
   selecting the weighting parameter as a value of a calibration curve relating the weighting parameter to the noise reduction goal.

4. The non-transitory computer-readable medium of claim 2, wherein the received user input indicative of the noise reduction goal for the reconstructed image is indicative of a desired maximum noise level.

5. The non-transitory computer-readable medium of claim 4, wherein the desired maximum noise level is the desired maximum noise level in the liver.

6. The non-transitory computer-readable medium of claim 1, wherein the determining of the edge sensitivity parameter includes:
   receiving a user input indicative of a desired quantitation goal for the reconstructed image; and
   selecting the edge sensitivity parameter based on the received user input indicative of the desired quantitation goal for the reconstructed image and the determined weighting parameter ($\beta$).

7. The non-transitory computer-readable medium of claim 6, wherein the selecting includes one of:
   selecting the edge sensitivity parameter using a lookup table associating values of the edge sensitivity parameter with values of the quantitation goal, and
   selecting the edge sensitivity parameter as a value of a calibration curve relating the edge sensitivity parameter to the quantitation goal.

8. The non-transitory computer-readable medium of claim 7, wherein the received user input indicative of the quantitation goal for the reconstructed image is indicative of a desired standardized uptake value (SUV) preservation, or SUV normalized by lean body mass (SUL) preservation.

9. The non-transitory computer-readable medium of claim 1, wherein the method further comprises:
   displaying a plurality of sample reconstructed images generated by reconstructing a sample imaging data set by applying the regularized image reconstruction including the edge-preserving regularization with different weighting and edge sensitivity parameters to the sample imaging data set;
   receiving a user selection of one of the displayed plurality of sample reconstructed images; and
   at least one of:
      determining the weighting parameter based on the weighting parameter used in generating the selected sample reconstructed image; and
      determining the edge sensitivity parameter based on the edge sensitivity parameter used in generating the selected sample reconstructed image.

10. The non-transitory computer-readable medium of claim 9, wherein the determining includes:
    setting a default value of one of the weighting parameter or the edge sensitivity parameter;
    inputting the default value into a lookup table; and
    determining the other of the weighting parameter and the edge sensitivity parameter from a corresponding value in the lookup table.

11. The non-transitory computer-readable medium of claim 1, wherein the reconstructing of the imaging data set obtained by the image acquisition device to generate the reconstructed image is performed by applying the regularized image reconstruction including the edge-preserving regularization with the determined weighting and edge sensitivity parameters and guided by an image or attenuation map generated by computed tomography (CT).

12. An imaging system, comprising:
    an image acquisition device configured to acquire an imaging data set; and
    at least one electronic processor programmed to:
       determine an overall noise level in a plurality of images retrieved from a database, the plurality of images having a preferred noise level consistent with a noise reduction goal;
       determine a weighting parameter ($\beta$) of an edge-preserving regularization of a regularized image reconstruction for the imaging data set obtained by the image acquisition device based on the determined overall noise level;

determine a edge sensitivity parameter ($\gamma$) of the edge-preserving regularization for the imaging data set obtained by the image acquisition device; and reconstruct the imaging data set obtained by the image acquisition device to generate a reconstructed image by applying the regularized image reconstruction including the edge-preserving regularization with the determined weighting parameter ($\beta$) and the determined edge sensitivity parameter ($\gamma$) to the imaging data set obtained by the image acquisition device.

13. The imaging system of claim 12, wherein the determining of the weighting parameter includes:

selecting the weighting parameter based on the determined overall noise level by operations including one of:

selecting the weighting parameter using a lookup table associating values of the weighting parameter with values of the determined overall noise level, and selecting the weighting parameter as a value of a calibration curve relating the weighting parameter to the determined overall noise level.

14. The imaging system of claim 12, wherein the determination of the overall noise level in the plurality of images retrieved from the database is an overall noise level in a liver.

15. The imaging system of claim 12, wherein the determining of the edge sensitivity parameter includes:

receiving a user input indicative of a desired quantitation goal for the reconstructed image; and selecting the edge sensitivity parameter based on the received user input indicative of the desired quantitation goal for the reconstructed image by operations including one of:

selecting the edge sensitivity parameter using a lookup table associating values of the edge sensitivity parameter with values of the quantitation goal, and selecting the edge sensitivity parameter as a value of a calibration curve relating the edge sensitivity parameter to the quantitation goal.

16. The imaging system of claim 15, wherein the received user input indicative of the quantitation goal for the reconstructed image is indicative of a desired standardized uptake value (SUV) preservation.

17. An imaging system, comprising:

an image acquisition device configured to acquire imaging data; and at least one electronic processor programmed to:

determine a weighting parameter of an edge-preserving regularization of a regularized image reconstruction for an imaging data set obtained by the image acquisition device by selecting the weighting parameter based on a received user input indicative of a noise reduction goal for the reconstructed image;

determine an edge sensitivity parameter of the edge-preserving regularization for the imaging data set obtained by the image acquisition device by selecting the edge sensitivity parameter based on a received user input indicative of a desired quantitation goal for the reconstructed image; and reconstruct the imaging data set obtained by the image acquisition device to generate a reconstructed image by applying the regularized image reconstruction including the edge-preserving regularization with the determined weighting and edge sensitivity parameters to the imaging data set obtained by the image acquisition device, wherein the received user input indicative of the noise reduction goal for the reconstructed image is indicative of a desired maximum noise level in a liver; and the received user input indicative of the noise reduction goal is determined by operations including:

retrieving a plurality of images from a database, the plurality of images having a preferred noise level consistent with the noise reduction goal;

determining an overall noise level in the plurality of images;

inputting the overall noise level to select the weighting parameter.

* * * * *